(12) United States Patent
Gao et al.

(10) Patent No.: US 12,098,868 B2
(45) Date of Patent: Sep. 24, 2024

(54) CONTROL METHOD FOR HYDROGEN-FUELED DOMESTIC GAS WATER HEATER

(71) Applicant: NORTH CHINA MUNICIPAL ENGINEERING DESIGN & RESEARCH INSTITUTE CO., LTD., Tianjin (CN)

(72) Inventors: Wenxue Gao, Tianjin (CN); Yingjie Hu, Tianjin (CN); Weiye Zhou, Tianjin (CN); Qingwei Miao, Tianjin (CN); Rongsong Yan, Tianjin (CN); Yan Wang, Tianjin (CN); Lin Yang, Tianjin (CN)

(73) Assignee: NORTH CHINA MUNICIPAL ENGINEERING DESIGN & RESEARCH INSTITUTE CO., LTD., Tianjin (CN)

( * ) Notice: Subject to any disclaimer, the term of this patent is extended or adjusted under 35 U.S.C. 154(b) by 0 days.

(21) Appl. No.: 18/558,496

(22) PCT Filed: Jan. 28, 2023

(86) PCT No.: PCT/CN2023/073564
§ 371 (c)(1),
(2) Date: Nov. 1, 2023

(87) PCT Pub. No.: WO2023/155663
PCT Pub. Date: Aug. 24, 2023

(65) Prior Publication Data
US 2024/0271825 A1  Aug. 15, 2024

(30) Foreign Application Priority Data
Feb. 17, 2022  (CN) .......................... 202210148182.1

(51) Int. Cl.
*F24H 9/20* (2022.01)
*F24H 9/00* (2022.01)

(52) U.S. Cl.
CPC ......... *F24H 9/2035* (2013.01); *F24H 9/0005* (2013.01)

(58) Field of Classification Search
CPC ........ F24H 9/2035; F24H 9/0005; F24H 9/20; F24H 9/14; F24H 15/35; F24H 15/30; F24H 15/305; F24H 15/144; F24H 15/148
See application file for complete search history.

(56) References Cited

FOREIGN PATENT DOCUMENTS

| CN | 2658641 Y | 11/2004 |
|----|-----------|---------|
| CN | 200946917 | 9/2007 |

(Continued)

OTHER PUBLICATIONS

English translation of CN-201935414-U, dated May 16, 2024 (Year: 2024).*

(Continued)

*Primary Examiner* — Edelmira Bosques
*Assistant Examiner* — Brett Peterson Mallon

(57) ABSTRACT

Disclosed is a control method for a hydrogen-fueled domestic gas water heater. A staged combustion technology and a fully premixed combustion technology are combined in the method, a controller judges a combustion mode according to inlet water flow and set hot water input temperature, staged combustion of the hydrogen on a combustor is achieved due to the arrangement of two electromagnetic valves and the staged combustor, and meanwhile the stable combustion of the hydrogen can be achieved by adjusting a rotating speed (Continued)

of a fan and magnitude of currents of a gas proportional valve; and an oxygen sensor is arranged on a exhaust pipe, and the controller judges whether actual hydrogen combustion reaches an optimal state by monitoring outlet water temperature and oxygen concentration in flue gas and performs adjustment.

5 Claims, 4 Drawing Sheets

(56) References Cited

FOREIGN PATENT DOCUMENTS

| CN | 101839552 | A | * | 9/2010 | | |
|---|---|---|---|---|---|---|
| CN | 201935414 | U | * | 8/2011 | | |
| CN | 105387613 | A | | 3/2016 | | |
| CN | 107339808 | A | * | 11/2017 | ........... | F24H 9/2035 |
| CN | 109579280 | A | * | 4/2019 | | |
| CN | 110159575 | A | | 8/2019 | | |
| CN | 111578306 | A | | 8/2020 | | |
| CN | 111595030 | | | 8/2020 | | |
| CN | 114484885 | A | | 5/2022 | | |
| JP | S6329111 | A | | 2/1988 | | |
| KR | 870001449 | | | 3/1987 | | |

OTHER PUBLICATIONS

English translation of CN-109579280-A, dated May 16, 2024 (Year: 2024).*
English translation of CN-101839552-A, dated May 16, 2024 (Year: 2024).*
English translation of CN-107339808-A, dated May 16, 2024 (Year: 2024).*
International Search Report of PCT/CN2023/073564.
Written Opinion of PCT/CN2023/073564.

* cited by examiner

CONTROL METHOD FOR HYDROGEN-FUELED DOMESTIC GAS WATER HEATER

CROSS-REFERENCE TO RELATED APPLICATIONS

This Application is a national stage application of PCT/CN2023/073564. This application claims priorities from PCT Application No. PCT/CN2023/073564, filed Jan. 28, 2023, and from the Chinese patent application 202210148182.1 filed Feb. 17, 2022, the content of which are incorporated herein in the entirety by reference.

TECHNICAL FIELD

The present disclosure belongs to the field of urban gas combustion and application, and particularly relates to a control method for a hydrogen-fueled domestic gas water heater.

BACKGROUND ART

At present, a gas source of a domestic gas water heater is mainly natural gas and liquefied petroleum gas, and as the national "carbon peak and carbon neutrality" goals are proposed, hydrogen energy, as clean and low-carbon green energy, is expected to be popularized in the field of domestic gas water heaters. However, physical and chemical properties of hydrogen are greatly different from those of the natural gas and the liquefied petroleum gas, resulting in the inability to stable combustion on an existing gas water heater. A flameout protection device of the existing gas water heater mostly adopts a flame induction needle to monitor a flame combustion state. Its principle is as follows: plasma generated when the natural gas or the liquefied petroleum gas is combusted forms ionization currents on the induction needle, and whether gas is extinguished is detected based on an ionization characteristic; however, the plasma cannot be generated by hydrogen combustion, such that the flame induction needle fails, resulting in potential safety hazards. In addition, a flame propagation speed of hydrogen combustion is high, flame flashback easily occurs, and the flame flashback phenomenon will be worsened due to low ignition temperature and short flameout distance of hydrogen combustion, resulting in great potential safety hazards. Moreover, compared with the natural gas and the liquefied petroleum gas, the density and heat productivity of the hydrogen are low, so that a heat load of a traditional domestic gas water heater will be greatly reduced when the hydrogen is adopted as fuel, and the water heater cannot have a wide heat load adjusting range, affecting use performance; if a flow rate of the hydrogen is increased, the tendency of hydrogen flame flashback will be worsened, and meanwhile, in order to achieve an air amount required by combustion, a rotating speed of a fan will be correspondingly increased, resulting in high noise. In addition, a product of hydrogen combustion is gaseous water, and when the gaseous water passes through an exhaust pipe, saturated water vapor is easily turned into condensate water, which corrodes the exhaust pipe, and even affects heat exchangers and a combustor, resulting in great potential safety hazards during long-time operation.

At present, in order to widen the heat load adjusting range of the gas water heater, reduce noise of the fan and achieve output of hot water at constant temperature, a fan variable-frequency speed regulation and staged combustion technology is mostly used. Patent for disclosure (publication number: CN110207386A) has disclosed a "gas water heater adopting staged combustion and control method thereof". A controller switches fire levels by controlling staged valves to be opened or closed, and different fire levels are limited in different current regions of a gas proportional valve in a current linkage control manner. Patent for disclosure (publication number: CN111520713A) has disclosed a "closed fully premixed combustion system and water heater". A fully premixed manner of injecting air by gas is applied, an air injection amount of an injection pipe is controlled by gas pressure and a rotating speed of a fan together, and staged control over combustion is achieved on the basis of fully premixed combustion. However, the above patents only achieve two stages of combustion, and cannot solve the problem that an adjusting range is narrowed since a heat load is greatly reduced when the hydrogen is adopted as fuel. Meanwhile, the above patents adopt an up-draught fan, which is arranged on a top and cannot precisely control an air amount entering a combustor, easily resulting in instable combustion, and the service life of the fan will be affected by condensate water generated by hydrogen combustion.

Patent for disclosure (publication number: CN112146286A) has disclosed a "control method and control system for air amount matching of gas water heater". A theoretical air amount of a fan is determined to adjusted an air amount according to fire sections and a programmed staged air amount adjusting relationship that is matched with heat loads corresponding to the fire sections. However, the patent performs adjustment only through the theoretical air amount of the fan, and cannot judge an actual air amount required for combustion, so that an optimal combustion effect cannot be ensured. Patent for disclosure (publication number: CN112113349A) has disclosed a "control method for water heater and water heater". Whether a water heater is under stable combustion is judged by detecting a noise value of the water heater at a current stage and an air pressure value of a flue. However, the present disclosure cannot precisely sense fluctuation of a combustion state, which is easily disturbed by environmental noise. Meanwhile, in the disclosure, when a maximum heat load is reached, an air amount and a gas amount are kept balanced by turning down a gas proportional valve, resulting in decrease in hot water outlet temperature and inability to meet the requirements of hot water at constant temperature. Patent for disclosure (publication number: CN110274395A) has disclosed a "control method for self-adaptive fully premixed gas water heater and gas water heater". Combustion in the water heater is monitored by acquiring gas flow, flow of a fan and content of excess oxygen after combustion. However, the present disclosure cannot have a wide heat load adjusting range due to no staged combustion technology, so that it cannot output hot water at constant temperature. Moreover, when hydrogen is adopted as fuel, and when a heat load of the water heater changes, a flow rate of the hydrogen in a combustor cannot be kept in a flame flashback limit, easily resulting in flame flashback.

SUMMARY

The present disclosure aims at providing a control method for a hydrogen-fueled domestic gas water heater to overcome the defects in the prior art. By means of the control method, safe and stable combustion of the hydrogen on the gas water heater can be achieved, and the flame flashback from hydrogen combustion and the corrosion of condensate water to the water heater can be avoided, meanwhile, the water heater has a wide heat load adjusting range, and can output hot water at constant temperature.

The present disclosure provides a control method for a hydrogen-fueled domestic gas water heater, including the following steps:

step 1, refitting an existing domestic gas water heater, wherein a refitting structure is as follows: a combustor containing three combustion groups is installed in a combustion chamber, the combustion groups include a left combustion group, a middle combustion group and a right combustion group; an outlet end of a gas mixing pipe is divided into three gas mixing pipe branches, an outlet of a left gas mixing pipe branch provided with a first electromagnetic valve communicates with the left combustion group, an outlet of a middle gas mixing pipe branch communicates with the middle combustion group, an outlet of a right gas mixing pipe branch provided with a second electromagnetic valve communicates with the right combustion group, an air outlet of a fan communicates with an inlet of the gas mixing pipe, a gas inlet end of a gas pipe penetrates through a shell of the gas water heater, an outlet end of the gas pipe communicates with the gas mixing pipe, a gas proportional valve is installed on the gas pipe, and an oxygen sensor is installed on an exhaust pipe communicating with a condensation chamber; and the fan and the gas proportional valve are connected with a controller through a control line, so as to control hydrogen flow and air flow, the oxygen sensor is connected with the controller through a control line, and the controller reads oxygen concentration signal output by the oxygen sensor and outputs a control signal to the fan, so as to adjust a rotating speed of the fan;

step 2, controlling the domestic gas water heater, including the following steps:

S10, setting, by a user, hot water temperature $T_{set}$ on a control panel connected with the controller; calculating, by the controller, a theoretical heat load $\Phi$, getting into a staged combustion mode if the theoretical heat load is less than ⅔ of a maximum heat load $\Phi_{max}$, and then executing a next step; or else, getting into a full-stage combustion mode, and then executing S30;

S20, outputting, by the controller, a closing signal to the first electromagnetic valve or the second electromagnetic valve if ⅓$\Phi_{max}$<$\Phi$<⅔$\Phi_{max}$, and outputting, by the controller, a closing signal to the first electromagnetic valve and the second electromagnetic valve if $\Phi$<⅓$\Phi_{max}$; then calculating actual hydrogen flow $Q_h$ entering the gas pipe according to the theoretical heat load, adjusting currents $I_b$ of the gas proportional valve according to a linear relationship between the currents $I_b$ of the gas proportional valve and the actual hydrogen flow $Q_h$, and controlling an opening degree of the gas proportional valve; executing a next step when the currents $I_b$ of the gas proportional valve reach a corresponding value; and outputting, by the controller, an alternate closing signal to the first electromagnetic valve or the second electromagnetic valve when ⅓$\Phi_{max}$<$\Phi$<⅔$\Phi_{max}$;

S21, adjusting, by the controller, a rotating speed R of the fan according to a proportional relationship between a preset rotating speed R of the fan and actual air inlet flow entering the mixing pipe, so that a ratio of the actual air inlet flow to theoretical air inlet flow ranges from 1.05 to 1.25;

S22, reading, by the controller, an outlet water temperature $T_{out}$ output by a temperature sensor installed on a water outlet pipe and an oxygen concentration C output by the oxygen sensor; judging whether a difference between the outlet water temperature $T_{out}$ and the hot water temperature $T_{set}$ set by the user meets a preset requirement; if yes, executing a next step; or else, executing S24;

S23, judging whether the oxygen concentration C in flue gas meets a preset range; if yes, executing S40; if the oxygen concentration C is less than the preset range, returning to S21, and increasing the rotating speed of the fan; and if the oxygen concentration C is greater than the preset range, returning to S21, and reducing the rotating speed of the fan;

S24, judging magnitudes of the outlet water temperature $T_{out}$ and the hot water temperature $T_{set}$ set by the user; if $T_{out}$>$T_{set}$, returning to S20, and reducing the currents $I_b$ of the gas proportional valve; or else, executing S30;

S30, outputting, by the controller, an opening signal to the first electromagnetic valve and the second electromagnetic valve, and opening the first electromagnetic valve and the second electromagnetic valve;

S31, calculating, by the controller, hydrogen flow entering the gas pipe according to the theoretical heat load $\Phi$, adjusting the currents $I_b$ of the gas proportional valve according to a ratio of preset currents $I_b$ of the gas proportional valve to the hydrogen flow, and controlling the opening degree of the gas proportional valve;

S32, adjusting, by the controller, the rotating speed R of the fan according to the proportional relationship between the preset rotating speed R of the fan and the actual air inlet flow, so that the ratio of the actual air inlet flow to the theoretical air inlet flow ranges from 1.05 to 1.25;

S33, reading, by the controller, the outlet water temperature $T_{out}$ output by the temperature sensor installed on the water outlet pipe and the oxygen concentration C output by the oxygen sensor; judging whether the difference between the outlet water temperature $T_{out}$ and the hot water temperature $T_{set}$ set by the user meets the preset requirement; if yes, executing a next step; or else, executing S35;

S34, judging whether the oxygen concentration C in the flue gas meets the preset range; if yes, executing S40; if the oxygen concentration C is less than the preset range, returning to S32, and increasing the rotating speed of the fan; and if the oxygen concentration C is greater than the preset range, returning to S32, and reducing the rotating speed of the fan;

S35, judging the magnitudes of the outlet water temperature $T_{out}$ and the hot water temperature $T_{set}$ set by the user; if $T_{out}$>$T_{set}$, returning to S31, and reducing the currents $I_b$ of the gas proportional valve; or else, executing S36;

S36, judging whether the currents $I_b$ of the gas proportional valve reach a preset maximum value, if yes, reducing, by the controller, currents $I_s$ of a water yield servo valve, reducing an opening degree of the water yield servo valve, so as to reduce inlet water flow, and returning to S33; or else, returning to S31, and increasing the currents $I_b$ of the gas proportional valve; and S40, retaining the rotating speed R of the fan, the currents $I_b$ of the gas proportional valve and the currents $I_s$ of the water yield servo valve unchanged, and keeping normal combustion of the hydrogen.

The present disclosure has the beneficial effects:
1. According to the control method provided by the present disclosure, within different heat load ranges, a flow rate of the hydrogen in the combustor can be kept within a flame flashback limit, such that flame flashback from hydrogen combustion can be avoided; and meanwhile, a combustion state of the hydrogen can be monitored, it is ensured that the hydrogen flow and the air flow are always kept in an optimal combustion ratio, such that flame flashback generated during fluctuation of gas pressure and external air pressure is avoided, thereby keeping stable combustion of the hydrogen.
2. The domestic gas water heater provided by the present disclosure can have a wide heat load adjusting range through a staged combustion technology and have a function of outputting hot water at constant temperature, and meanwhile can achieve stable combustion of the hydrogen in the combustor; and heat efficiency of the water heater can be improved through condensation-based heat exchange, energy is saved, and corrosion of the condensate water to the exhaust pipe and heat exchangers is alleviated.

BRIEF DESCRIPTION OF THE DRAWINGS

Drawings of the specification constituting a part of the present disclosure are described for further understanding the present disclosure. Schematic embodiments of the present disclosure and descriptions thereof are schematic of the present disclosure, and are not construed as an improper limitation to the present disclosure.

DETAILED DESCRIPTION OF THE PRESENT DISCLOSURE

It should be noted that the following detailed descriptions are exemplary, which are intended to further explain the present application. Unless otherwise indicated, all technical and scientific terms used herein have the same meaning as commonly understood by those ordinarily skilled in the prior art to which the present application pertains.

It should be noted that the terms used here are not intended to limit the exemplary implementations according to the present application, but are merely descriptive of the specific implementations. Unless otherwise directed by the context, singular forms of terms used here are intended to include plural forms. Besides, it should be also appreciated that, when the terms "comprise" and/or "include" are used in the specification, it is indicated that characteristics, steps, operations, devices, assemblies, and/or combinations thereof exist.

Additionally, any directional indication (such as upper, lower, left, right, front, back, or the like) involved in the embodiments of the present disclosure is only used for explaining relative position relations, movement conditions and the like of components in a certain specific posture (as shown in figures). If the specific posture changes, the directional indications may change accordingly.

Figure 1:
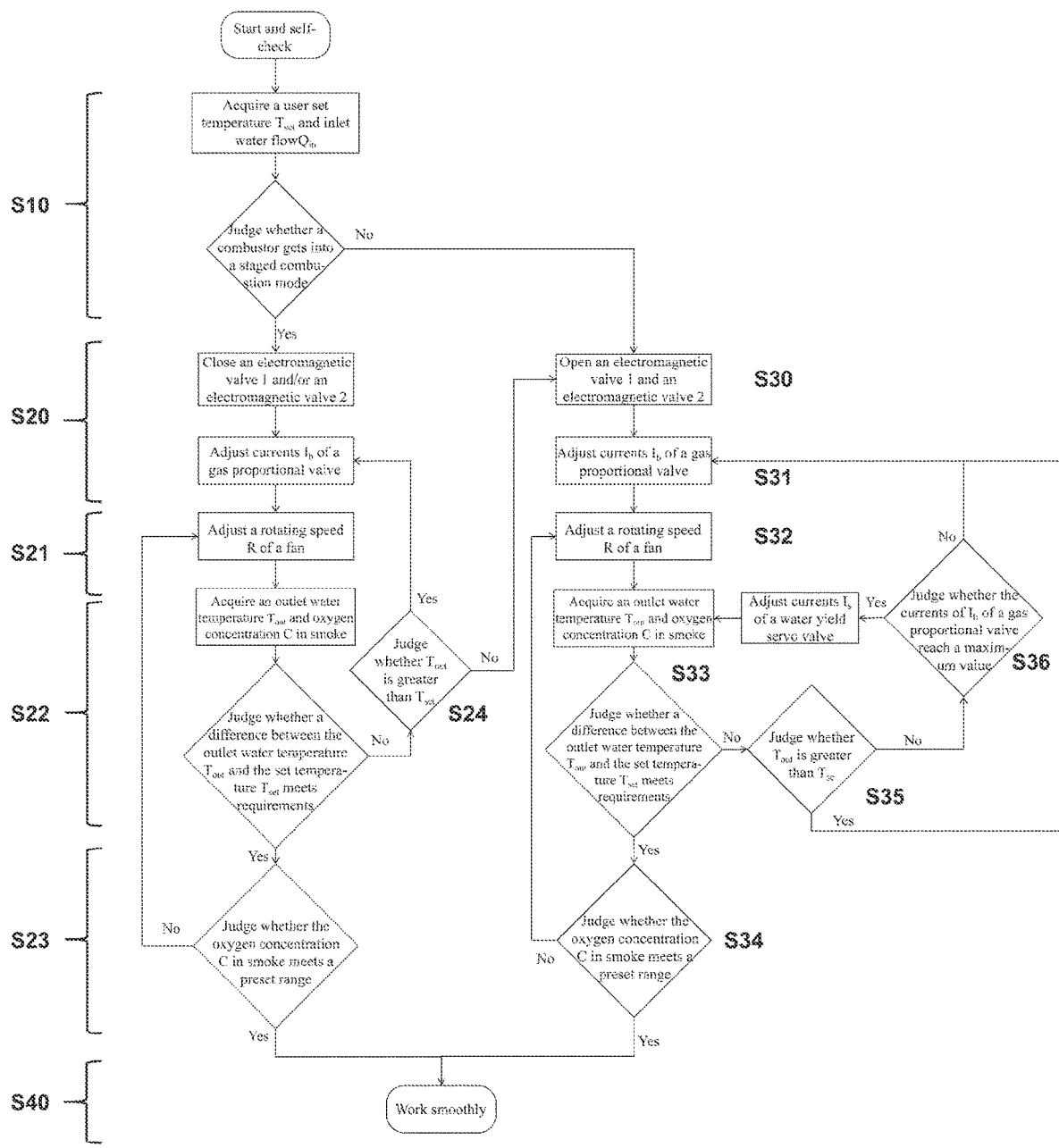
FIG. 1 is a flowchart of a control method for a hydrogen-fueled domestic gas water heater according to the present disclosure.
Figure 2:
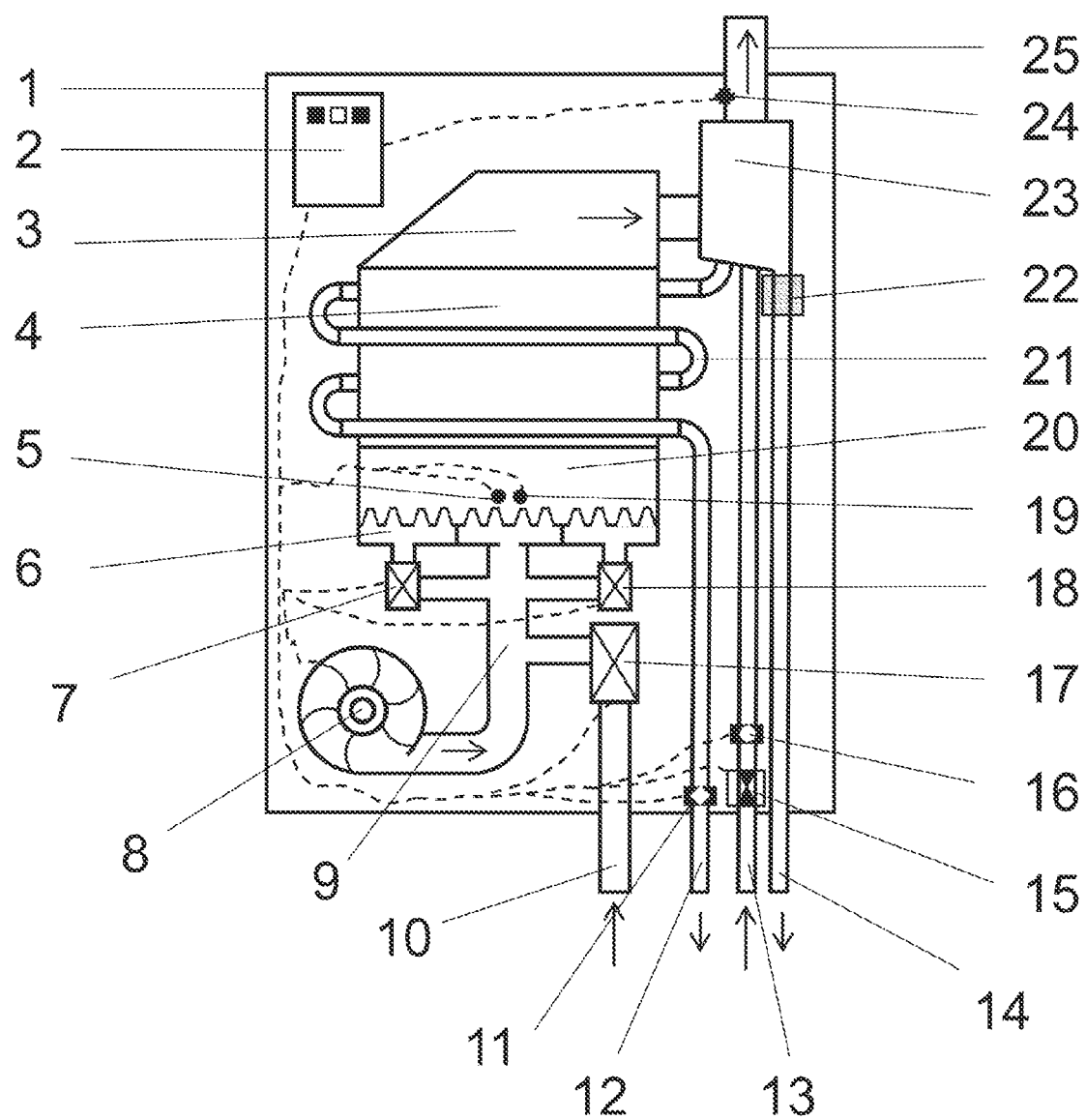
FIG. 2 is a schematic structural diagram of a hydrogen-fueled domestic gas water heater according to the present disclosure.
Figure 3:
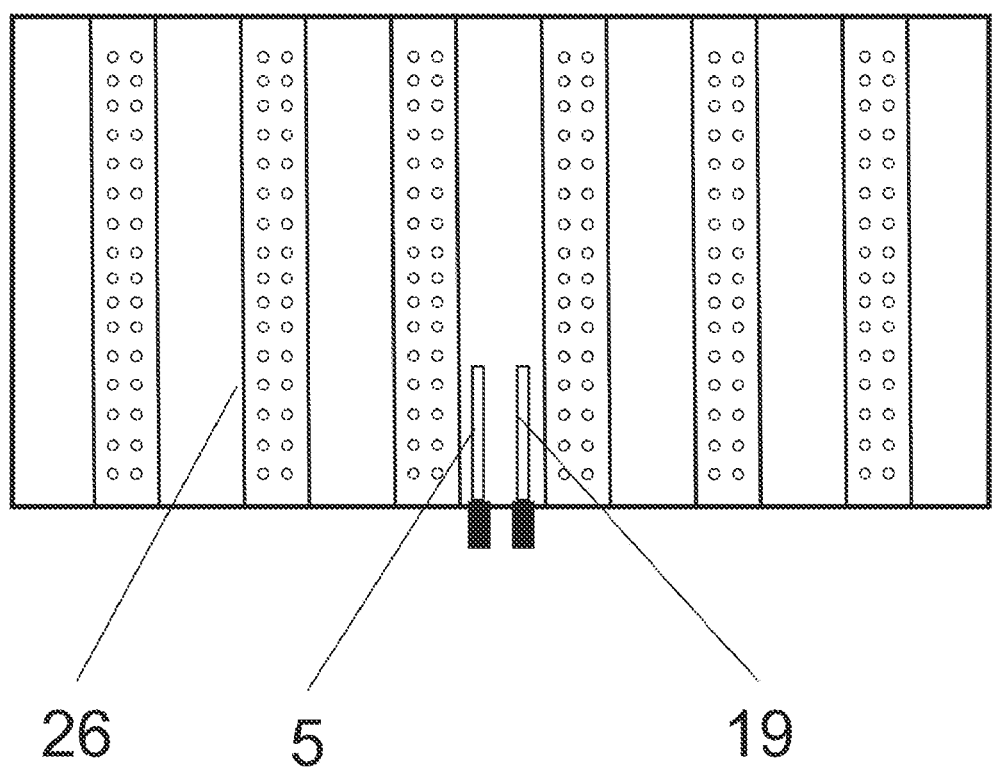
FIG. 3 is a top view of a combustor with round fire holes of a hydrogen-fueled domestic gas water heater according to the present disclosure.
Figure 4:
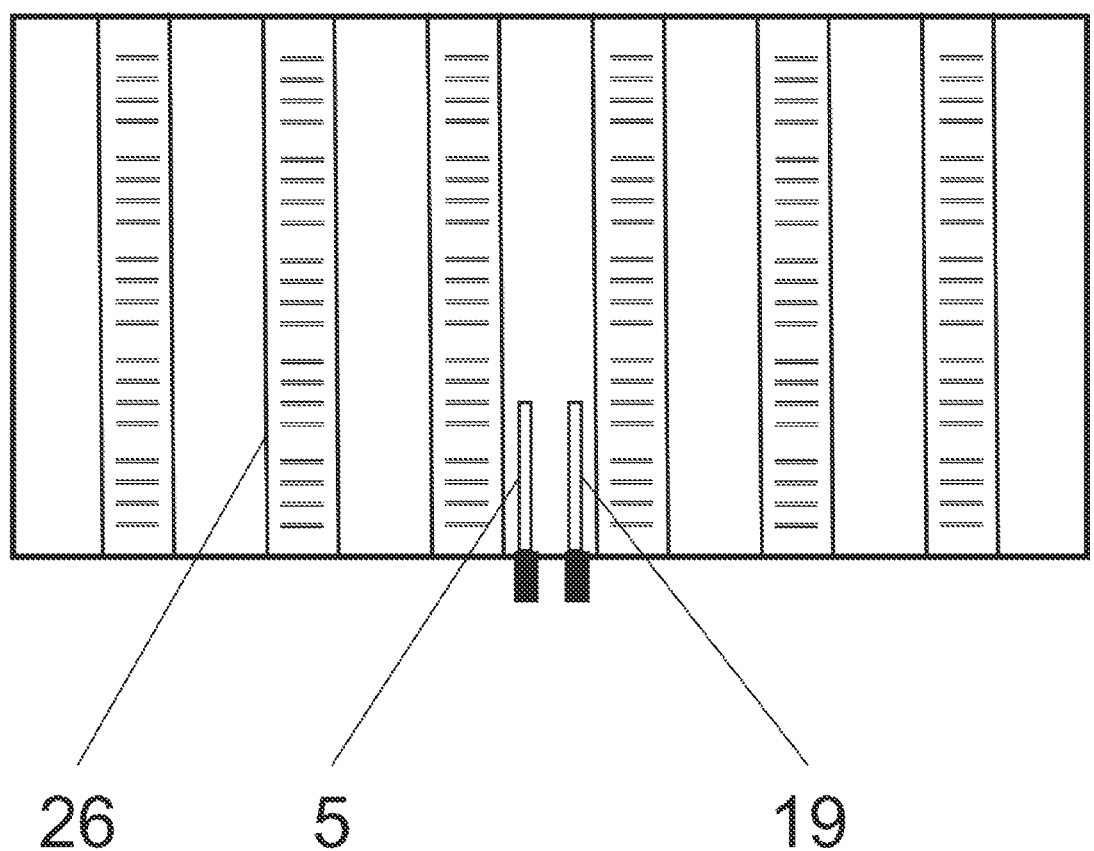
FIG. 4 is a top view of a combustor with slit-type fire holes of a hydrogen-fueled domestic gas water heater according to the present disclosure.

As shown in FIG. 1, the present disclosure provides a control method for a hydrogen-fueled domestic gas water heater, including the following steps:

Step 1, an existing domestic gas water heater is refit, wherein a refitting structure is as follows: a combustor 6 containing three combustion groups is installed in a combustion chamber, namely, a left combustion group, a middle combustion group and a right combustion group; an outlet end of a gas mixing pipe 9 is divided into three gas mixing pipe branches, an outlet of a left gas mixing pipe branch provided with a first electromagnetic valve 7 communicates with the left combustion group, an outlet of a middle gas mixing pipe branch communicates with the middle combustion group, and an outlet of a right gas mixing pipe branch provided with a second electromagnetic valve 18 communicates with the right combustion group. An air outlet of a fan 8 communicates with an inlet of the gas mixing pipe 9, a gas inlet end of a gas pipe 10 penetrates through a shell of the gas water heater, an outlet end of the gas pipe communicates with the gas mixing pipe 9, and a gas proportional valve 17 is installed on the gas pipe. An oxygen sensor 24 is installed on a exhaust pipe 25 communicating with a condensation chamber 23.

The fan 8 and the gas proportional valve 17 are connected with a controller 2 through a control line, so as to control hydrogen flow and air flow. The oxygen sensor 24 is connected with the controller through a control line, and the controller reads oxygen concentration signal output by the oxygen sensor 24 and outputs a control signal to the fan, so as to adjust a rotating speed of the fan.

The fan 8 is a direct-current variable-frequency fan preferably, which can change inlet flow of air by adjusting the rotating speed of the fan, so as to keep a mixing ratio of the air to the hydrogen, thereby achieving an optimal combustion effect.

Step 2, the domestic gas water heater is controlled, including the following steps:

S10, a user sets hot water temperature $T_{set}$ on a control panel connected with the controller 2, the controller 2 calculates a theoretical heat load $\Phi$, the combustor gets into a staged combustion mode if the theoretical heat load is less than 2/3 of a maximum heat load $\Phi_{max}$, and then a next step is executed; or else, the combustor gets into a full-stage combustion mode, and then S30 is executed;

a formula for the controller 2 to calculate the theoretical heat load is $\Phi = 1/\eta * C_p * Q_{in}(T_{set} - T_{in})$;

Wherein, $\Phi$ is the theoretical heat load when the user sets the hot water temperature $T_{set}$; $Q_{in}$ is inlet water flow of a water inlet pipe, which is obtained by a water flow sensor 16; $C_p$ is a specific heat capacity of water, which is a fixed value; $T_{in}$ is inlet water temperature, which is obtained by a temperature sensor 11 installed on a water outlet pipe when the water heater is started; $\eta$ is heat efficiency of the gas water heater, which is a measured value; and the maximum heat load $\Phi_{max}$ is a maximum heat load theoretically reachable after the combustor gets into the full-stage combustion mode, which is a set value.

During actual use of the gas water heater, the hot water temperature $T_{set}$ set by the user and the inlet water flow $Q_{in}$ are values that dynamically change according to real-time requirements of the user; thus, when the gas water heater gets into a stable combustion state, if $T_{set}$ and $Q_{in}$ change, S10 needs to be executed again, and the combustion mode of the combustor is adjusted to be matched with a new user requirement, thereby keeping stable combustion of the hydrogen.

S20, the controller 2 outputs a closing signal to the first electromagnetic valve 7 or the second electromagnetic valve 18 if $1/3\Phi_{max}<\Phi<<2/3\Phi_{max}$, and the controller 2 outputs a closing signal to the first electromagnetic valve 7 and the second electromagnetic valve 18 if $\Phi<1/3\Phi_{max}$; then actual hydrogen flow $Q_h$ entering the gas pipe 10 is calculated according to the theoretical heat load, currents $I_b$ of the gas proportional valve are adjusted according to a linear relationship between the preset currents $I_b$ of the gas proportional valve 17 and the actual hydrogen flow $Q_h$, and an opening degree of the gas proportional valve is controlled; a next step is executed when the currents $I_b$ of the gas proportional valve reach a corresponding value;

please refer to a relational expression about a heat load and gas flow in Table 12 in the National Standard GB 6932-2015 *Domestic Gas Instantaneous Water Heater* for a calculation method for the actual hydrogen flow;

with respect to the linear relationship between preset currents $I_b$ of the gas proportional valve and the actual hydrogen flow $Q_h$, an $I_b$-$Q_h$ curve should be determined in advance, and stored in the controller;

S21, the controller adjusts the rotating speed R of the fan according to a proportional relationship between a preset rotating speed R of the fan and actual air inlet flow entering the mixing pipe 9, so that a ratio of the actual air inlet flow to theoretical air inlet flow ranges from 1.05 to 1.25; this achieves the advantages that complete combustion of the hydrogen can be ensured, flame flashback of the hydrogen during combustion is avoided, meanwhile, high noise caused by too high rotating speed of the fan is avoided, and flue gas temperature and heat efficiency are prevented from being reduced by redundant air; meanwhile, the controller controls an ignition device to ignite the middle combustion group or the middle combustion group and the left combustion group or the right combustion group, such that the combustor gets into the staged combustion mode;

the theoretical air inlet flow is an air amount required for the hydrogen to be completely combusted, which is calculated according to a combustion reaction equation $2H_2+O_2=2H_2O+\Delta H$ and the hydrogen flow, if the actual hydrogen flow $Q_h$ is n, theoretical oxygen inlet flow is n/2, and the theoretical air inlet flow is (n/2)÷0.21=50*n/21;

the actual air inlet flow is flow of air actually entering the mixing pipe through the fan, which is calculated according to the proportional relationship between the rotating speed R of the fan and the air amount, and a linear relationship between the rotating speed R of the fan and the air amount should be determined in advance and stored in the controller;

S22, the controller reads an outlet water temperature $T_{out}$ output by the temperature sensor 11 installed on the water outlet pipe and an oxygen concentration C output by the oxygen sensor 24; whether a difference between the outlet water temperature $T_{out}$ and the hot water temperature $T_{set}$ set by the user meets a preset requirement is judged; if yes, a next step is executed; or else, S24 is executed;

usually, the difference between the outlet water temperature $T_{out}$ and the hot water temperature $T_{set}$ should fall within +/−3° C.;

S23, whether the oxygen concentration C in flue gas meets a preset range is judged; if yes, S40 is executed; if the oxygen concentration C is less than the preset range, it returns to S21, and the rotating speed of the fan is increased; and if the oxygen concentration C is greater than the preset range, it returns to S21, and the rotating speed of the fan is reduced;

S24, magnitudes of the outlet water temperature $T_{out}$ and the hot water temperature $T_{set}$ set by the user are judged; if $T_{out}>T_{set}$, it returns to S20, and the currents $I_b$ of the gas proportional valve are reduced; or else, S30 is executed;

the preset range of the oxygen concentration C in the flue gas is calculated according to the theoretical air inlet flow and the actual air inlet flow, the ratio of the actual air inlet flow to the theoretical air inlet flow ranges from 1.05 to 1.25, only oxygen in the air is consumed in a combustion reaction according to the combustion reaction equation $2H_2+O_2=2H_2O+\Delta H$, and no other gas is generated; if the ratio of the actual air inlet flow to the theoretical air inlet flow is k, the oxygen concentration C obtained after combustion is $0.21*(k-1)/[0.21*(k-1)+0.79*k]$, and the preset range of the oxygen concentration in the flue gas ranges from 1.25% to 5.05%;

S30, the controller outputs an opening signal to the first electromagnetic valve and the second electromagnetic valve, and the first electromagnetic valve and the second electromagnetic valve are opened;

S31, the controller calculates hydrogen flow entering the gas pipe 10 according to the theoretical heat load $\Phi$, the currents $I_b$ of the gas proportional valve are adjusted according to a ratio of the preset currents $I_b$ of the gas proportional valve to the hydrogen flow, and the opening degree of the gas proportional valve is controlled;

S32, the controller adjusts the rotating speed R of the fan according to the proportional relationship between the preset rotating speed R of the fan and the actual air inlet flow, so that the ratio of the actual air inlet flow to the theoretical air inlet flow ranges from 1.05 to 1.25; complete combustion of the hydrogen can be ensured, flame flashback of the hydrogen during combustion is avoided, meanwhile, high noise caused by too high rotating speed of the fan is avoided, and flue gas temperature and heat efficiency are prevented from being reduced by redundant air; meanwhile, the controller controls the ignition device to perform ignition, such that the combustor gets into the staged combustion mode;

S33, the controller reads the outlet water temperature $T_{out}$ output by the temperature sensor 11 installed on the water outlet pipe and the oxygen concentration C output by the oxygen sensor 24; whether the difference between the outlet water temperature $T_{out}$ and the hot water temperature $T_{set}$ set by the user meets the preset requirement is judged; if yes, a next step is executed; or else, S35 is executed;

usually, the difference between the outlet water temperature $T_{out}$ and the hot water temperature $T_{set}$ should fall within +/−3° C.;

S34, whether the oxygen concentration C in the flue gas meets the preset range is judged; if yes, S40 is executed; if the oxygen concentration C is less than the preset range, it returns to S32, and the rotating speed of the fan is increased; and if the oxygen concentration C is greater than the preset range, it returns to S32, and the rotating speed of the fan is reduced;

S35, the magnitudes of the outlet water temperature $T_{out}$ and the hot water temperature $T_{set}$ set by the user are judged; if $T_{out} > T_{set}$, it returns to S31, and the currents $I_b$ of the gas proportional valve are reduced; or else, S36 is executed;

S36, whether the currents $I_b$ of the gas proportional valve reach a preset maximum value is judged, if yes, it indicates that the gas proportional valve has reached a maximum opening degree, the hydrogen flow is maximum, the heat load of the water heater cannot be increased at this time, and if the outlet water temperature is unchanged, it is necessary to adjust a water yield servo valve to reduce the inlet water flow; if $I_b$ reaches the preset maximum value, the controller reduces the currents $I_s$ of the water yield servo valve and reduces the opening degree of the water yield servo valve so as to reduce the inlet water flow, and it returns to S33; or else, it returns to S31, and the currents $I_b$ of the gas proportional valve are increased;

S40, the rotating speed R of the fan, the currents $I_b$ of the gas proportional valve and the currents $I_s$ of the water yield servo valve are kept unchanged, and normal combustion of the hydrogen is kept.

The working principle of the present disclosure is as follows:

The inlet water flow, the outlet water temperature and the oxygen content in the flue gas can be monitored by connecting the controller with the temperature sensor, the water flow sensor and the oxygen sensor; and the air flow, the hydrogen flow and the inlet water flow can be controlled by connecting the controller with the fan, the gas proportional valve, the first electromagnetic valve, the second electromagnetic valve and the water yield servo valve.

Firstly, whether the combustor gets into the staged combustion mode or the full-stage combustion mode is judged by calculating the theoretical heat load according to the hot water temperature set by the user and the inlet water flow; if the combustor gets into the staged combustion mode, the first electromagnetic valve and/or the second electromagnetic valve are/is closed according to the heat load; if the combustor gets into the full-stage combustion mode, the first electromagnetic valve and the second electromagnetic valve are opened; the hydrogen flow is calculated according to the theoretical heat load, the opening degree of the valve is controlled by changing the currents of the gas proportional valve, so as to control the hydrogen flow, and the hydrogen enters the gas mixing pipe through the gas pipe; the rotating speed of the fan is determined according to the hydrogen flow, such that the air flow and the hydrogen flow reach an optimal combustion ratio, the air enters the gas mixing pipe through the fan, the air and the hydrogen reach the combustor after being mixed in the gas mixing pipe, meanwhile, the controller controls the ignition device to perform ignition, and stable combustion of the hydrogen on the combustor is achieved; flue gas from combustion is subjected to sensible heat exchange with a tube heat exchanger in a heat exchange chamber after passing through the heat exchange chamber upwards, then enters a flue gas collecting hood, and then enters the condensation chamber to be subjected to latent heat exchange with a plate heat exchanger in the condensation chamber, saturated water vapor is condensed into liquid water to enter a condensate water collection device, and then drained through a drain pipe, and the remaining flue gas is exhausted through the exhaust pipe; in addition, whether actual combustion reaches an optimal state is judged by monitoring the outlet water temperature and the oxygen concentration in the flue gas; and if not, the currents of the gas proportional valve and the rotating speed of the fan are adjusted, so as to achieve the optimal combustion state. According to the method, the combustor can be within different heat load ranges, a flow rate of the hydrogen in the combustor can be kept within a flame flashback limit, such that flame flashback from hydrogen combustion can be avoided; and meanwhile, a combustion state of the hydrogen can be monitored, it is ensured that the hydrogen flow and the air flow are always kept in an optimal combustion ratio, thereby keeping stable combustion of the hydrogen.

A structure of the hydrogen-fueled domestic gas water heater provided by the present disclosure is shown in the figure. The domestic gas water heater includes a shell 1, the controller is installed on an inner wall of the shell, a body is installed in an inner middle of the shell, the body internally includes the combustion chamber 20 and the heat exchange chamber 4 which are sequentially arranged from bottom to top, a top wall of the heat exchange chamber 4 is covered with the flue gas collecting hood 3, the combustor 6 is installed in the combustion chamber 20, and fire holes in the combustor may be round or in a slit type.

The finned tube heat exchanger is installed in the heat exchange chamber 4, a heat exchange pipeline 21 is arranged outside the heat exchange chamber in a coiled manner, the condensation chamber 23 is arranged on an inner upper portion of the shell, the plate heat exchanger is installed in the condensation chamber 23, a top wall of the condensation chamber is connected with a bottom of the exhaust pipe 25 with an upper portion penetrating through the shell, the condensate water collection device 22 is connected to a bottom wall of the condensation chamber and connected with the drain pipe 14 penetrating through a bottom wall of the shell, the water inlet pipe 13 provided with the water yield servo valve 15 and the water flow sensor 16 is connected with an inlet of the plate heat exchanger in the condensation chamber, an outlet of the plate heat exchanger is connected with an inlet of the finned tube heat exchanger in the heat exchange chamber, an outlet of the finned tube heat exchanger is connected to one end of the heat exchange pipe arranged outside the heat exchange chamber in a coiled manner, and the other end of the heat exchange pipeline is connected with one end of the water outlet pipe 12 provided with the temperature sensor 11; and cold water enters the plate heat exchanger in the condensation chamber from the water inlet pipe 13 for primary heat exchange with the flue gas firstly, and then enters the tube heat exchanger in the heat exchange chamber for secondary heat exchange, the saturated water vapor in the flue gas from combustion can be condensed into the water to prevent corrosion to a flue and the heat exchangers, and meanwhile the heat efficiency of the water heater can be improved, thereby saving energy. The saturated water vapor in the flue gas is condensed into the water after passing through the plate heat exchanger, and then enters the drain pipe through the condensate water collection device to be drained, and other gas in the flue gas is discharged through the exhaust pipe 25 above the condensation chamber; and the oxygen sensor 24 is arranged on the exhaust pipe and connected with the controller, so as to monitor the oxygen content in the flue gas.

An air outlet of the fan 8 installed on an inner lower portion of the shell communicates with an inlet of the gas mixing pipe 9, a gas inlet end of the gas pipe 10 penetrates through the shell of the gas water heater, an outlet end of the gas pipe communicates with the gas mixing pipe 9, and the gas proportional valve 17 is installed on the gas pipe. The combustor 6 includes the three combustion groups, namely, the left combustion group, the middle combustion group and the right combustion group; and the outlet end of the gas mixing pipe 9 is divided into the three gas mixing pipe branches, the outlet of the left gas mixing pipe branch provided with the first electromagnetic valve 7 communicates with the left combustion group, the outlet of the middle gas mixing pipe branch communicates with the middle combustion group, and the outlet of the right gas mixing pipe branch provided with the second electromagnetic valve 18 communicates with the right combustion group. The ignition device 19 and a flameout protection device 5 which are connected with the controller are fixed to an outer wall of the combustion chamber, an ignition needle is adopted as the ignition device, and a thermocouple is adopted as the flameout protection device, thereby achieving ignition and flame monitoring of the combustor.

The water yield servo valve and the water flow sensor are connected with the controller, so as to monitor the inlet water flow; and the temperature sensor is installed on the water outlet pipe and connected with the controller, so as to monitor the outlet water temperature.

The controller is connected with the fan and the gas proportional valve, so as to control the hydrogen flow and the air flow.

According to the present disclosure, staged combustion of the hydrogen on the combustor can be achieved by opening or closing the two electromagnetic valves, a wide heat load adjusting range is achieved, meanwhile, stable combustion of the hydrogen can be achieved in cooperation with adjustment of the rotating speed of the fan, and therefore hydrogen flame flashback is avoided; when the two electromagnetic valves are closed, the hydrogen is combusted only in the middle stage of the combustor, and small fire combustion of the combustor can be achieved in cooperation with the gas proportional valve and the fan; when one electromagnetic valve is closed, the combustion groups on the middle stage and one side work, and medium fire combustion of the combustor can be achieved; and when the two electromagnetic valves are opened, all the combustion groups work, and large fire combustion of the combustor can be achieved.

The above description is only the preferred embodiments of the present application, and is not intended to limit the present application, and for those skilled in the art, the present application may have various modifications and variations. Any modification, equivalent replacement, improvement, etc. made within the spirit and principle of the present application shall fall within the protection scope of the present application.

What is claimed is:

1. A control method for a hydrogen-fueled domestic gas water heater, including the following steps:
    step 1, refitting an existing domestic gas water heater, wherein a refitting structure is as follows: a combustor containing three combustion groups is installed in a combustion chamber, the combustion groups include a left combustion group, a middle combustion group and a right combustion group; an outlet end of a gas mixing pipe is divided into three gas mixing pipe branches, an outlet of a left gas mixing pipe branch provided with a first electromagnetic valve communicates with the left combustion group, an outlet of a middle gas mixing pipe branch communicates with the middle combustion group, an outlet of a right gas mixing pipe branch provided with a second electromagnetic valve communicates with the right combustion group, an air outlet of a fan communicates with an inlet of the gas mixing pipe, a gas inlet end of a gas pipe penetrates through a shell of the gas water heater, an outlet end of the gas pipe communicates with the gas mixing pipe, a gas proportional valve is installed on the gas pipe, and an oxygen sensor is installed on an exhaust pipe communicating with a condensation chamber; and the fan and the gas proportional valve are connected with a controller through a control line, so as to control hydrogen flow and air flow, the oxygen sensor is connected with the controller through a control line, and the controller reads oxygen concentration signal output by the oxygen sensor and outputs a control signal to the fan, so as to adjust a rotating speed of the fan;
    step 2, controlling the domestic gas water heater, including the following steps:
    S10, setting, by a user, hot water temperature $T_{set}$ on a control panel connected with the controller; calculating, by the controller, a theoretical heat load $\Phi$, getting into a staged combustion mode if the theoretical heat load is less than $2/3$ of a maximum heat load $\Phi_{max}$, and then executing a next step; or else, getting into a full-stage combustion mode, and then executing S30;
    S20, outputting, by the controller, a closing signal to the first electromagnetic valve or the second electromagnetic valve if $1/3\Phi_{max}<\Phi<<2/3\Phi_{max}$, and outputting, by the controller, a closing signal to the first electromagnetic valve and the second electromagnetic valve if $\Phi<1/3\Phi_{max}$; then calculating actual hydrogen flow $Q_h$ entering the gas pipe according to the theoretical heat load, adjusting currents $I_b$ of the gas proportional valve according to a linear relationship between the currents $I_b$ of the gas proportional valve and the actual hydrogen flow $Q_h$, and controlling an opening degree of the gas proportional valve; executing a next step when the currents $I_b$ of the gas proportional valve reach a corresponding value; and outputting, by the controller, an alternate closing signal to the first electromagnetic valve or the second electromagnetic valve when $1/3\Phi_{max}<\Phi<<2/3\Phi_{max}$;
    S21, adjusting, by the controller, a rotating speed R of the fan according to a proportional relationship between a preset rotating speed R of the fan and actual air inlet flow entering the mixing pipe, so that a ratio of the actual air inlet flow to theoretical air inlet flow ranges from 1.05 to 1.25;
    S22, reading, by the controller, an outlet water temperature $T_{out}$ output by a temperature sensor installed on a water outlet pipe and an oxygen concentration C output by the oxygen sensor; judging whether a difference between the outlet water temperature $T_{out}$ and the hot water temperature $T_{set}$ set by the user meets a preset requirement; if yes, executing a next step; or else, executing S24;
    S23, judging whether the oxygen concentration C in flue gas meets a preset range; if yes, executing S40; if the oxygen concentration C is less than the preset range, returning to S21, and increasing the rotating speed of the fan; and if the oxygen concentration C is greater than the preset range, returning to S21, and reducing the rotating speed of the fan;
    S24, judging magnitudes of the outlet water temperature $T_{out}$ and the hot water temperature $T_{set}$ set by the user; if $T_{out}>T_{set}$, returning to S20, and reducing the currents $I_b$ of the gas proportional valve; or else, executing S30;
    S30, outputting, by the controller, an opening signal to the first electromagnetic valve and the second electromagnetic valve, and opening the first electromagnetic valve and the second electromagnetic valve;

S31, calculating, by the controller, hydrogen flow entering the gas pipe according to the theoretical heat load Φ, adjusting the currents $I_b$ of the gas proportional valve according to a ratio of preset currents $I_b$ of the gas proportional valve to the hydrogen flow, and controlling the opening degree of the gas proportional valve;

S32, adjusting, by the controller, the rotating speed R of the fan according to the proportional relationship between the preset rotating speed R of the fan and the actual air inlet flow, so that the ratio of the actual air inlet flow to the theoretical air inlet flow ranges from 1.05 to 1.25;

S33, reading, by the controller, the outlet water temperature $T_{out}$ output by the temperature sensor installed on the water outlet pipe and the oxygen concentration C output by the oxygen sensor; judging whether the difference between the outlet water temperature $T_{out}$ and the hot water temperature $T_{set}$ set by the user meets the preset requirement; if yes, executing a next step; or else, executing S35;

S34, judging whether the oxygen concentration C in the flue gas meets the preset range; if yes, executing S40; if the oxygen concentration C is less than the preset range, returning to S32, and increasing the rotating speed of the fan; and if the oxygen concentration C is greater than the preset range, returning to S32, and reducing the rotating speed of the fan;

S35, judging the magnitudes of the outlet water temperature $T_{out}$ and the hot water temperature $T_{set}$ set by the user; if $T_{out}>T_{set}$, returning to S31, and reducing the currents $I_b$ of the gas proportional valve; or else, executing S36;

S36, judging whether the currents $I_b$ of the gas proportional valve reach a preset maximum value, if yes, reducing, by the controller, currents $I_s$ of a water yield servo valve, reducing an opening degree of the water yield servo valve, so as to reduce inlet water flow, and returning to S33; or else, returning to S31, and increasing the currents $I_b$ of the gas proportional valve; and S40, retaining the rotating speed R of the fan, the currents $I_b$ of the gas proportional valve and the currents $I_s$ of the water yield servo valve unchanged, and keeping normal combustion of the hydrogen.

2. The control method according to claim 1, wherein the fan is a direct-current variable-frequency fan.

3. The control method according to claim 1, wherein in the staged combustion mode, the controller outputting an alternate closing signal to the first electromagnetic valve or the second electromagnetic valve when $1/3\Phi_{max}<\Phi<2/3\Phi_{max}$.

4. The control method according to claim 3, wherein the difference between the outlet water temperature $T_{out}$ and the hot water temperature $T_{set}$ should fall within +/−3° C.

5. The control method according to claim 2, wherein in the staged combustion mode, the controller outputting an alternate closing signal to the first electromagnetic valve or the second electromagnetic valve when $1/3\Phi_{max}<\Phi<<2/3\Phi_{max}$.

* * * * *